(12) United States Patent
Krishnan (10) Patent No.: US 7,779,136 B2
(45) Date of Patent: Aug. 17, 2010

(54) SECURE NEIGHBOR DISCOVERY BETWEEN HOSTS CONNECTED THROUGH A PROXY

(75) Inventor: Suresh Krishnan, Montreal (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 243 days.

(21) Appl. No.: 12/036,757

(22) Filed: Feb. 25, 2008

(65) Prior Publication Data

US 2009/0119407 A1    May 7, 2009

Related U.S. Application Data

(60) Provisional application No. 60/984,527, filed on Nov. 1, 2007.

(51) Int. Cl.
*G06F 15/16* (2006.01)
(52) U.S. Cl. ..................................... 709/228
(58) Field of Classification Search .................. 709/228
See application file for complete search history.

(56) References Cited

U.S. PATENT DOCUMENTS

| | | | |
|---|---|---|---|
| 6,930,988 B2 * | 8/2005 | Koodli et al. ............... | 370/331 |
| 2004/0109472 A1 * | 6/2004 | Choyi et al. ............... | 370/466 |
| 2004/0240669 A1 * | 12/2004 | Kempf et al. ............... | 380/277 |
| 2007/0113075 A1 * | 5/2007 | Jo et al. ...................... | 713/158 |
| 2008/0046597 A1 * | 2/2008 | Stademann et al. ......... | 709/249 |
| 2008/0198805 A1 * | 8/2008 | Weniger et al. ............. | 370/331 |
| 2008/0307516 A1 * | 12/2008 | Levy-Abegnoli et al. ....... | 726/9 |
| 2009/0190564 A1 * | 7/2009 | Hirano et al. ............... | 370/338 |

OTHER PUBLICATIONS

D. Eastlake et al., (Extensible markup Language) XML-Signature Syntax and Processing, Network Working Group, RFC 3275, Mar. 2002.
D. Thaler et al., Neighbor Discovery Proxies (ND Proxy), Network Working Group, RFC 4389, Apr. 2006.
J. Arkko et al., SEcure Neighbor Discovery (SEND), Network Working Group, RFC 3971, Mar. 2005.
Digital Signatures in the PDF Language, Adobe Systems Incorporated, Mar. 28, 2006.
G. Daley, Securing Proxy Neighbour Discovery Problem Statement, Internet Draft, Feb. 18, 2005.
J. Kempf, Secure IPv6 Address Proxying using Multi-Key Cryptographically Generated Addresses (MCGAs), Internet Draft, Aug. 1, 2007.
PCT Search Report from corresponding PCT application PCT/IB2008/054132.

* cited by examiner

*Primary Examiner*—Wing F Chan
*Assistant Examiner*—Tesfay Yohannes
(74) *Attorney, Agent, or Firm*—Alex Nicolaescu; Ericsson Canada Inc.

(57) ABSTRACT

A method, a proxy and a host are provided for securing neighbor discovery (ND) signaling between hosts when the hosts are connected through the proxy. A first host sends an original ND message comprising a first signature based on an address of the first host. The proxy removes the address of the first host and substitutes its own address in a modified ND message. The proxy then places a copy of the address of the first host in a new field and builds a proxy signature based on the own address of the proxy and on the new field. The new field and the proxy signature are added to the modified ND message. A second host receives the modified ND message from the proxy and verifies the proxy signature. The second host reconstructs the original ND message content and then verifies the first signature.

10 Claims, 9 Drawing Sheets

SECURE NEIGHBOR DISCOVERY BETWEEN HOSTS CONNECTED THROUGH A PROXY

PRIORITY STATEMENT UNDER 35 U.S.C. S.119(e) & 37 C.F.R. S.1.78

This non-provisional patent application claims priority based upon the prior U.S. provisional patent application entitled "Proxying Secure Neighbor Discovery Messages", application No. 60/984,527, filed Nov. 1, 2007, in the name of Suresh Krishnan.

TECHNICAL FIELD

The present invention relates to a method, a proxy and a host for securely proxying discovery messages.

BACKGROUND

Figure 1:
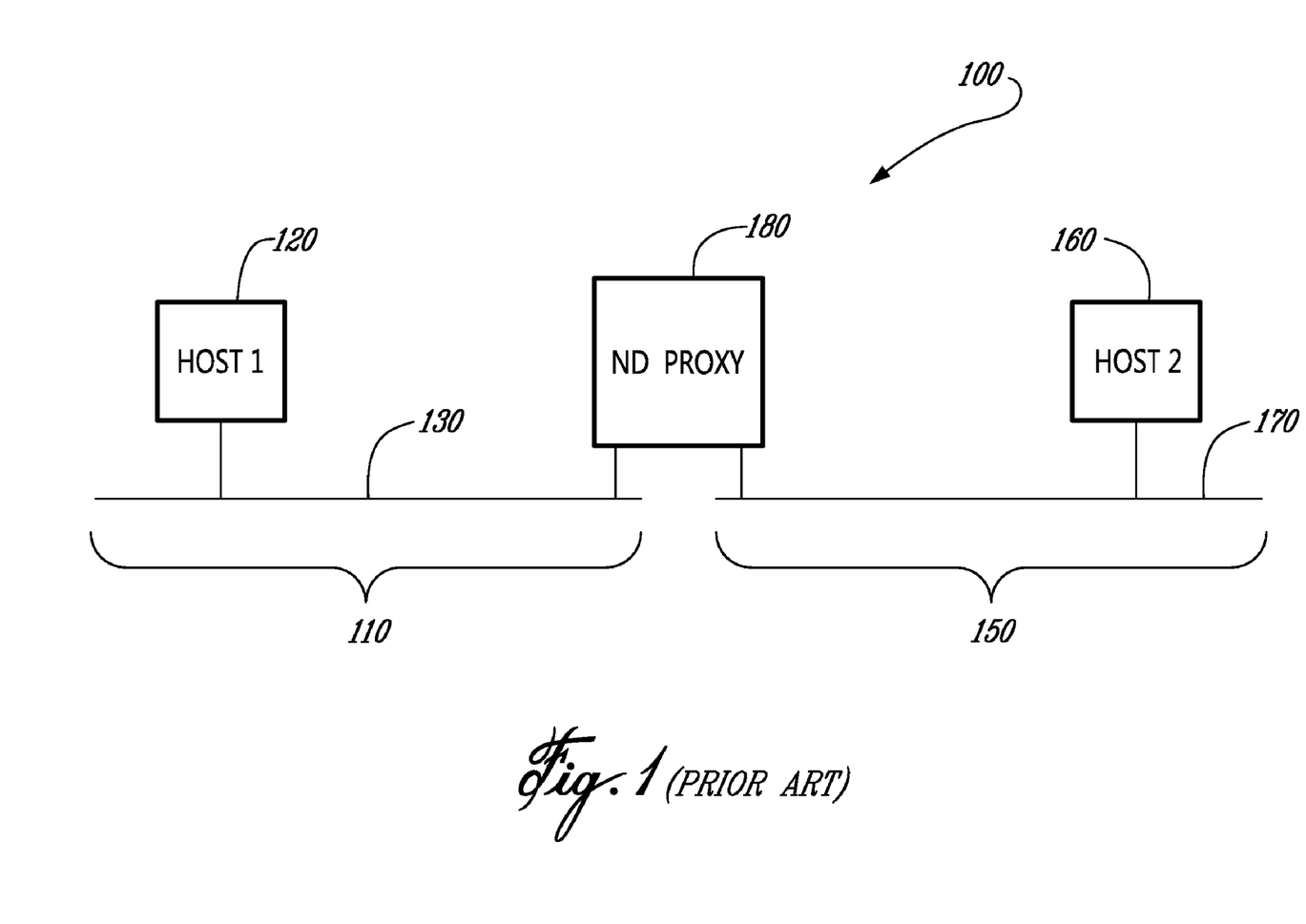
FIG. 1 is a prior art representation of a simple network comprising two subnetworks connected through a neighbor discovery proxy, which acts as a neighbor discovery proxy.

In packet-switched computer networks, nodes such as hosts and routers use neighbor discovery (ND) signaling to determine link layer addresses of neighbors known to reside on attached links. In order to allow networks to exist beyond single links, it is common to use bridges to connect subnetworks that do not share a common link. ND proxies provide a method for bridging multiple links into a single network. They do this by modifying ND signaling passing through them. The Internet Engineering Task Force (IETF) has published a Request For Comments (RFC), RFC4389, entitled "Neighbor Discovery Proxies (ND Proxy)", which describes a method by which multiple link layer segments are bridged into a single segment, through a proxy. RFC4389 specifies Internet Control Message Protocol (ICMP) Neighbor Solicitation and Neighbor Advertisement messages, used to enable hosts on either sides of a bridge to exchange addressing information to create bindings between Internet Protocol (IP) addresses and Media Access Control (MAC) addresses, the MAC addresses being also known as link layer addresses or layer 2 addresses. FIG. 1 (Prior Art) shows a simple network 100 comprising two subnetworks 110 and 150, connected through a bridge, which acts as a ND proxy 180. The subnetwork 110 comprises a first link layer connection 130, on which are connected several hosts such as a first host 120. Likewise, the subnetwork 150 comprises a second link layer connection 170, on which are connected several hosts such as a second host 160. The ND proxy 180 comprises ports connected to each of the first and second link layers 130 and 170. Each connection to one of the link layers comprises a MAC address. Hence, the first host 120 has a MAC address on the first link layer 130, the second host 160 has a MAC address on the second link layer 170, and the ND proxy 180 has two MAC addresses, one on each of the link layers. In order for the first host 120 to connect to the second host 160, without initially being aware of the MAC address of the second host 160, the first host 120 broadcasts a Neighbor Solicitation message comprising the IP and MAC addresses of the first host 120 and the IP address of the second host 160. The ND proxy 180 receives this Neighbor Solicitation message and may store the MAC address of the first host 120 in an internal cache. It forwards the Neighbor Solicitation message on the second link layer 170, after replacing the MAC address of the first host 120 inside the message with the MAC address of the ND proxy 180 on the second link layer 170. The second host 160 stores in a neighbor cache the IP address of the first host 120 in relation with the MAC address of the ND proxy 180 on the second link layer 170. The second host 160 then responds with a Neighbor Advertisement message placed on the second link layer 170, comprising the IP and MAC addresses of the second host 160 and, optionally, the IP address of the first host 120 and the MAC address of the ND proxy 180 on the second link layer 170. The ND proxy 180 detects the Neighbor Advertisement message of the second host 160, replaces the MAC address of the second host 160 with its own MAC address on the first link layer 130, replaces its own MAC address on the second link layer 170, if included, with the MAC address of the first host 120, and forwards the Neighbor Advertisement message on the first link layer 130. The first host 120 stores in a neighbor cache the IP address of the second host 160 in relation with the MAC address of the ND proxy 180 on the first link layer 110. If at any time later the first host 120 needs to communicate with the second host 160 by use of the IP address of the second host 160, its neighbor cache will indicate that any message or packet needs to be sent towards the MAC address of the ND proxy 180 on the first link layer 130. Likewise, if the second host 160 needs to communicate with the first host 120 by use of the IP address of the first host 120, the neighbor cache of the second host 160 will indicate that any message or packet needs to be sent towards the MAC address of the ND proxy 180 on the second link layer 170

RFC3971, entitled "SEcure Neighbor Discovery (SEND)", specifies a method for securing neighbor discovery signaling against specific threats, such as malicious modification (spoofing) of addresses in Neighbor Solicitation and Neighbor Advertisement messages. The SEND protocol provides a way of securing ND signaling so that receiving nodes can detect if ND packets have been tampered with. Digital signatures are used to protect messages relating to neighbor discovery. Signatures protect the integrity of the messages and authenticate the identity of their sender by using certificates to prove the identity of message senders. In fact, each message comprises a signature based on a private key of the sender and on addresses of the sender. At a receiving end, the signature may be verified by use of a public key of the sender, the public key of the sender being certified to the receiving end by use of a query towards a trust anchor that is known and trusted by both the receiving end and the sender. Verification of the signature validates the addresses of the sender.

Figure 2:
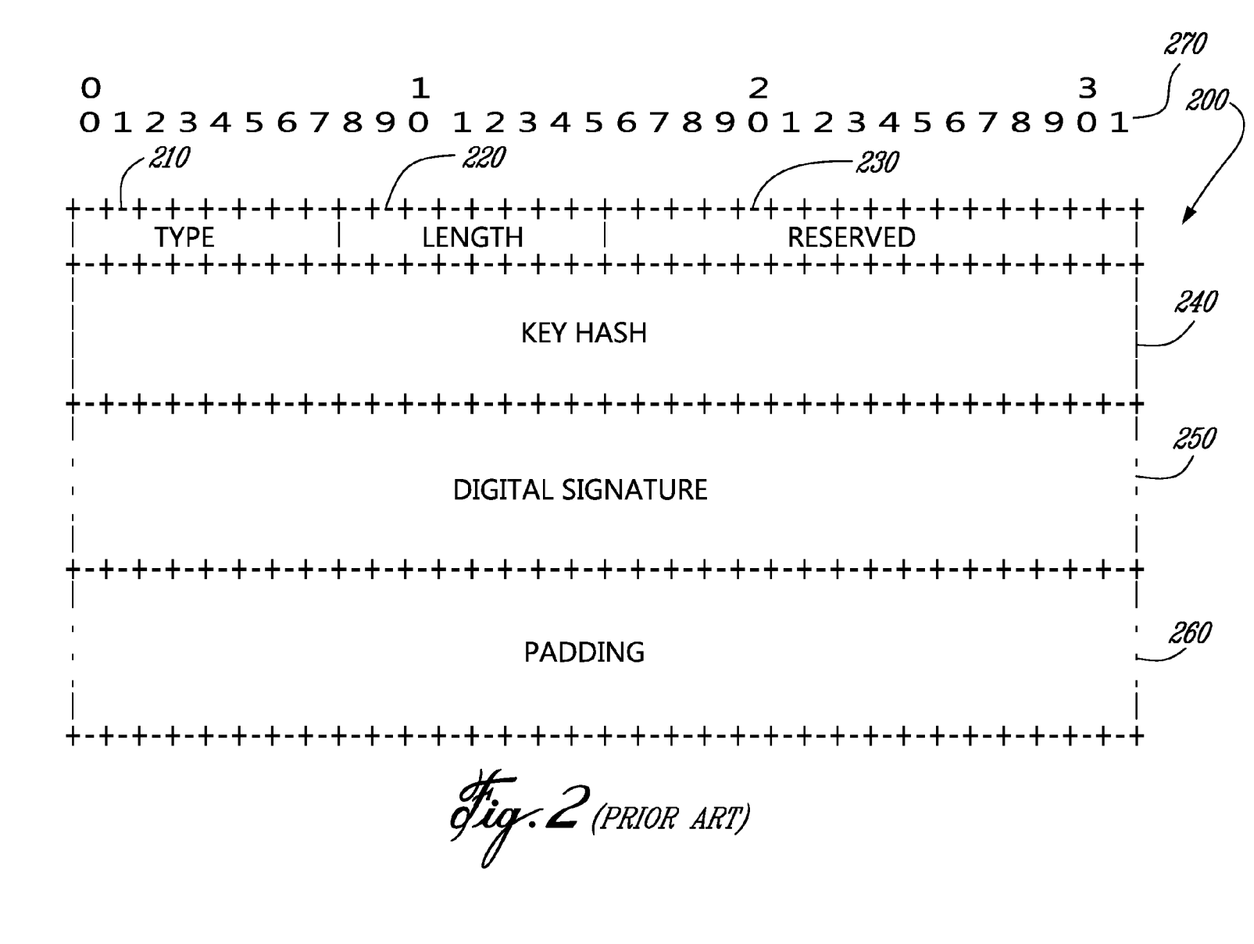
FIG. 2 is a prior art representation a format of a Rivest-Shamir-Adleman signature.

FIG. 2 (Prior Art) shows a format of a RSA signature. The RSA signature 200 is based on the well-known Rivest-Shamir-Adleman (RSA) algorithm and is specified in SEND. The RSA signature 200 is added to ND signaling messages. Bit markers 270 provide information regarding the format of the RSA signature 200. Fields included in the RSA signature 200 comprise:

Type 210: a value assigned by the IETF, and set equal to 12.
Length 220: A length of the RSA signature 200 (including all parameters in FIG. 2) in units of 8 octets.
Reserved 230: A 16-bit field, reserved for future use.
Key Hash 240: A 128-bit field containing the most significant (leftmost) 128 bits of a Secure Hash Standard-1 (SHA-1) hash of a public key used for constructing the RSA signature 200.
Digital Signature 250: A variable-length field containing a Public Key Cryptography Standards (PKCS) signature, constructed by using the sender's private key over the following sequence of octets:
 1. A 128-bit CGA Message Type tag value defined specifically for the SEND protocol.
 2. A 128-bit Source Address field from an IP header of the ND signaling messages being protected by the SEND protocol.
 3. A 128-bit Destination Address field from the IP header.

4. An 8-bit Type, 8-bit Code, and 16-bit Checksum fields from an Internet Control Message Protocol (ICMP) header of the protected message.
5. An ND proxy message header, starting from a first octet after an ICMP Checksum field and continuing up to but not including ND proxy specific parameters.
6. All ND proxy specific parameters preceding the RSA Signature 200. Specifically, these parameters comprise a link layer address of a node sending the ND message and, in the case where the ND message is a reply to another ND message, these parameters may also comprise a link layer address of a node towards which the message is intended.

Padding 260: A variable-length field contains padding.

All message parameters preceding the RSA signature 200 are included in the calculation of the digital signature 250. As a result, any "man in the middle" attack that might attempt to change some of these message parameters would be immediately detected by the receiving node upon verification of the signature.

SEND and ND Proxy are fundamentally incompatible because they are based on conflicting requirements. On one hand, as specified today, SEND assumes that a node advertising an IP address is the owner of the IP address and is in possession of the private key used to generate the digital signature based on the advertised IP address. On the other hand, with ND Proxy, the MAC address of the node which has initially advertised its IP address, and created a digital signature based on those IP and MAC addresses, is replaced within ND messages with a MAC address of the proxy. The digital signature of the original advertising node cannot be verified against its MAC address at the receiving end because that MAC address has been overwritten. In the presence of ND Proxy, the SEND protocol on the receiving end would infer that some malicious node may have tampered with original ND signaling when in fact it is a legitimate proxy that has modified the original ND signaling. RFC4389, which specifies "ND Proxy" and which was published in April 2006, after publication of the SEND RFC3971, expressly states that no mechanism is available for protection of proxy neighbor discovery processes. Proxy operation invalidates the RSA signatures, leading SEND-capable nodes that receive ND messages to either discard such messages or to treat them as unsecured.

SUMMARY

There would be clear advantages of having a method, a proxy and a host for allowing proxying of neighbor discovery messages, through a bridge, proxy or router, in a secure fashion.

It is therefore a broad object of this invention to provide a method, a proxy and a host for securing neighbor discovery (ND) signaling between hosts when the hosts are connected through the proxy. The present invention provides a method by which a ND proxy can replace a link layer address in any ND message with its own. A node receiving such a modified advertisement verifies whether the ND proxy has been authorized to perform the changes. For this verification, the node depends on a certificate issued to the ND proxy to authorize such changes. While ND proxying modifies an original content of ND messages passing through the proxy, thereby breaking any originating host signature, the proxy of the present invention preserves the original contents by moving them in new message fields prior to the modification. The proxy adds a proxy signature to the ND messages passing therethrough, allowing receiving hosts to verify the legitimacy of the modified ND messages. The receiving hosts may use the new message fields to rebuild the original contents of the ND messages, thereby repairing the originating host signature.

A first aspect of the present invention is directed a method of securing neighbor discovery between hosts connected through a proxy. The method starts when the proxy receives from a first host a neighbor discovery (ND) message intended for a second host. The ND message comprises an internet protocol (IP) address, a layer two address of the first host, and a first signature built by the first host based at least in part on the layer two address of the first host. The proxy modifies the ND message, first overwriting the layer two address of the first host with a layer two address of the proxy. The proxy further modifies the ND message by inserting a second signature of the proxy. The proxy signature is based at least in part on the layer two address of the proxy. The proxy then sends the modified ND message towards the second host.

A second aspect of the present invention is directed to a variant of the method of securing neighbor discovery between hosts connected through a proxy. The method comprises several additional steps. The proxy copies the layer two address of the first host in an additional field of the modified ND message and uses that additional field in calculating the second signature of the proxy. The second host, upon receiving the modified ND message, verifies the second signature of the proxy. The second host may further restore the ND message in its original form by overwriting the layer two address of the proxy with the layer two address of the first host. Hence, the second host may verify the first signature of the first host. The second host stores the IP address of the first host in relation with the layer two address of the proxy.

A third aspect of the present invention is directed to a method of securely receiving a neighbor discovery (ND) message in a host. The method starts when the host receives the ND message, which comprises a layer two address of a proxy, a layer two address of a peer host, a signature of the peer host and a signature of the proxy. The host verifies the proxy signature by use of a public key of the proxy. Then, the host modifies the ND message by replacing the layer two address of the proxy with the layer two address of the peer host. This enables the host to verify the signature of the peer host by use of a public key of the peer host. Following verification of the two signatures, the host stores the layer two address of the proxy as a layer two address for communicating with the peer host A fourth aspect of the present invention is directed to a proxy. The proxy has a first layer two connection used for receiving a neighbor discovery (ND) message from a first host. The proxy also has a processor that receives the ND message from the first layer two connection, and then reads from the ND message a first field comprising at least one original address, and a second field comprising a first signature of the first host. The processor then modifies the ND message by copying from the received ND message at least one original address into a third field. It then overwrites in the first field one of the at least one original address with an address of the proxy. The processor inserts a second signature of the proxy based on the address of the proxy and on the at least one original address. The processor then instructs a second layer two connection to send the modified ND message towards a second host.

A fifth aspect of the present invention is directed to a host. The host comprises a memory that stores a public key of a peer host, a public key of a proxy, and a link layer address for communicating with the peer host. The host further has a layer two connection used for receiving on a link a neighbor discovery (ND) message from a proxy. The ND message comprises a layer two address of the proxy, a layer two address of the peer host, a signature of the peer host, and a signature of the proxy. In the host, a processor verifies a signature of the proxy by use of the public key of the proxy. The processor then modifies the ND message by replacing the layer two address of the proxy with the layer two address of the peer host. The processor further verifies the signature of the peer host by use of the public key of the peer host. Following those verifications, the processor stores in the memory the link the layer two address of the proxy as the layer two address for communicating with the peer host.

BRIEF DESCRIPTION OF THE DRAWINGS

For a more detailed understanding of the invention, for further objects and advantages thereof, reference can now be made to the following description, taken in conjunction with the accompanying drawings, in which.

DETAILED DESCRIPTION

The innovative teachings of the present invention will be described with particular reference to various exemplary uses and aspects of the preferred embodiment. However, it should be understood that this embodiment provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the description of the figures, like numerals represent like elements of the invention.

According to the present invention, the roles of address ownership and address advertisement are explicitly separated. Normal operations of a standard neighbor discovery (ND) proxy are defined in Request For Comments (RFC) number 4389 of the Internet Engineering Task Force (IETF). The present invention provides a SEcure Neighbor discovery (SEND) proxy that comprises additional features for ensuring that a receiving node can differentiate between an authorized SEND proxy modifying an original ND message, and a malicious node doing the same. This is accomplished by modifying a ND message by signing it with a key of the authorized SEND proxy. The authorized SEND proxy also preferably includes, in the signed and modified ND message, original contents of the ND message it replaced; this can be used by the receiving node for further verification. The signature of the SEND proxy may be included in a new information field called proxy signature information (PSI). The signature is performed over ND proxy information fields present in the message, including a Rivest-Shamir-Adleman (RSA) signature field from the original ND message. The PSI is appended in the message, preferably as the last information field. The proxy signature has a similar format as that of the RSA signature, shown in FIG. 2, with some exceptions: First, it has a distinct Type value, different from the value of the Type 210 of FIG. 2. Second, because the digital signature is preferably based on all ND proxy specific parameters preceding the PSI, the digital signature within the PSI is preferably based in part on the RSA signature itself.

A method using the SEND proxy for allowing proxying of ND messages in a secure fashion, and a host capable of using the PSI, are also provided.

In the context of the present invention, the SEND proxy may comprise a bridge, a router, a switch, or any other packet-forwarding device. The SEND proxy may connect subnetworks having similar or dissimilar physical and/or link layer properties. In one example, the SEND proxy may connect two distinct Ethernet subnetworks. In another example, the SEND proxy may bridge between a wireless location area network (WLAN) and a cellular radio network. The host may comprise any end-terminal, end-user device, router, application server and the like. The host may comprise one or more physical connections, with associated link layer addresses and link layer properties. For example, a personal computer might comprise an Ethernet connection and a WLAN connection, either of which may be used in the context of the present invention. The host may also comprise a mobile terminal using both a Bluetooth™ and a cellular connection.

In the description of the present invention, the terms "layer 2", "link layer" and "media access control (MAC)" are used interchangeably.

Figure 3:
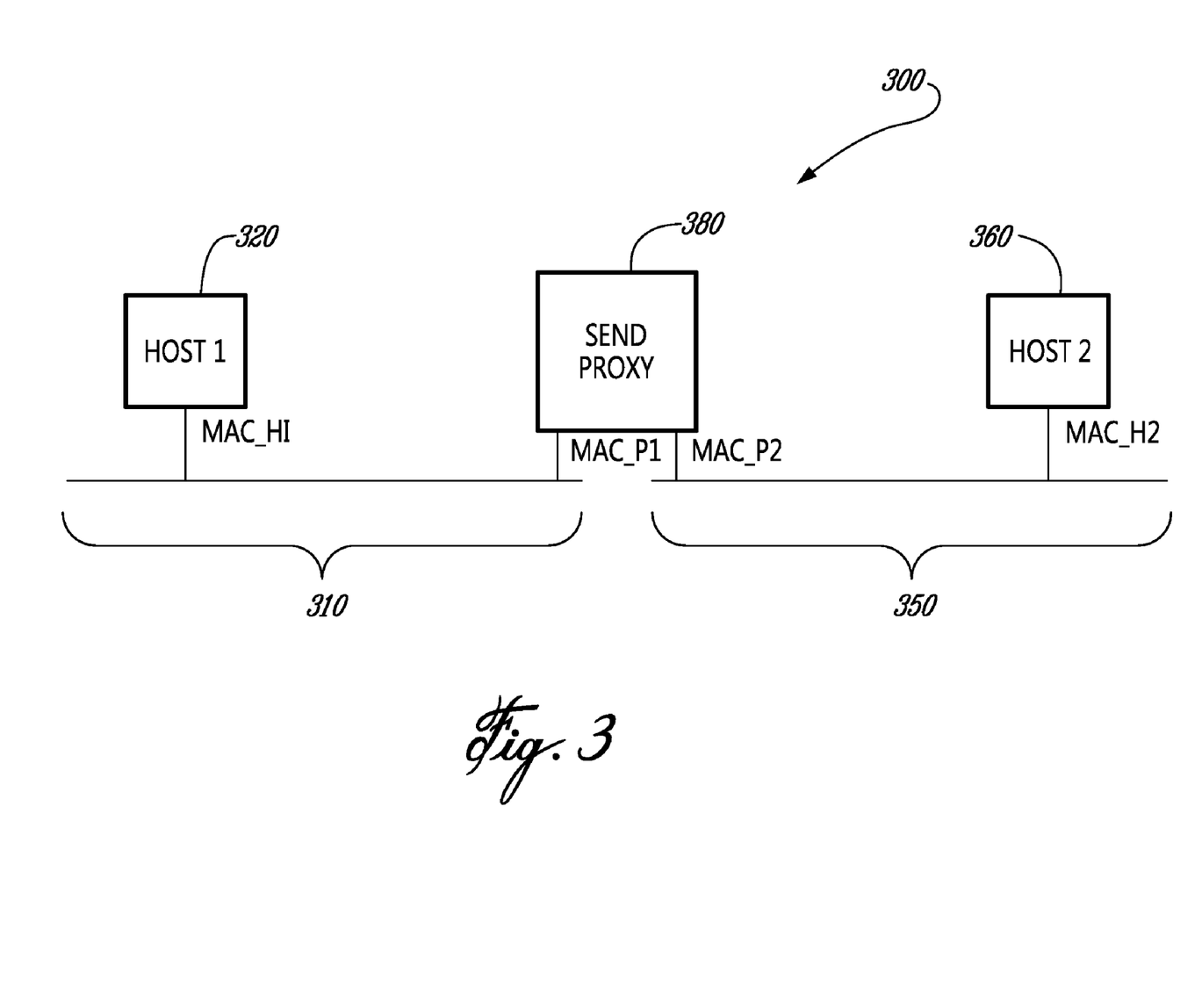
FIG. 3 shows an exemplary network comprising two subnetworks connected through a secure neighbor discovery proxy.

Reference is now made to the Drawings, in which FIG. 3 shows an exemplary network 300 comprising two subnetworks 310 and 350 connected through a SEND proxy 380. The network 300 comprises nodes built as per some teachings of the present invention. Each of the two subnetworks 310 and 350 support a host, respectively a first host 320 and second host 360. Of course, subnetworks 310 and 350 could support a much larger number of hosts, and the SEND proxy 380 could provide interconnection for a plurality of subnetworks. FIG. 3 is simplified for ease of illustration of the present invention. The first host 320 is connected on the subnetwork 310 via a port having a media access control (MAC) address MAC_H1. Likewise, the second host 320 is connected to the subnetwork 350 via a MAC address MAC_H2. Because the SEND proxy 380 has connections to both subnetworks, it has two MAC addresses MAC_P1 and MAC_P2, which respectively connect to subnetworks 310 and 350. Interactions between the first host 310, the second host 360 and the SEND proxy 380 are described in relation with the following figures.

Figure 4A:
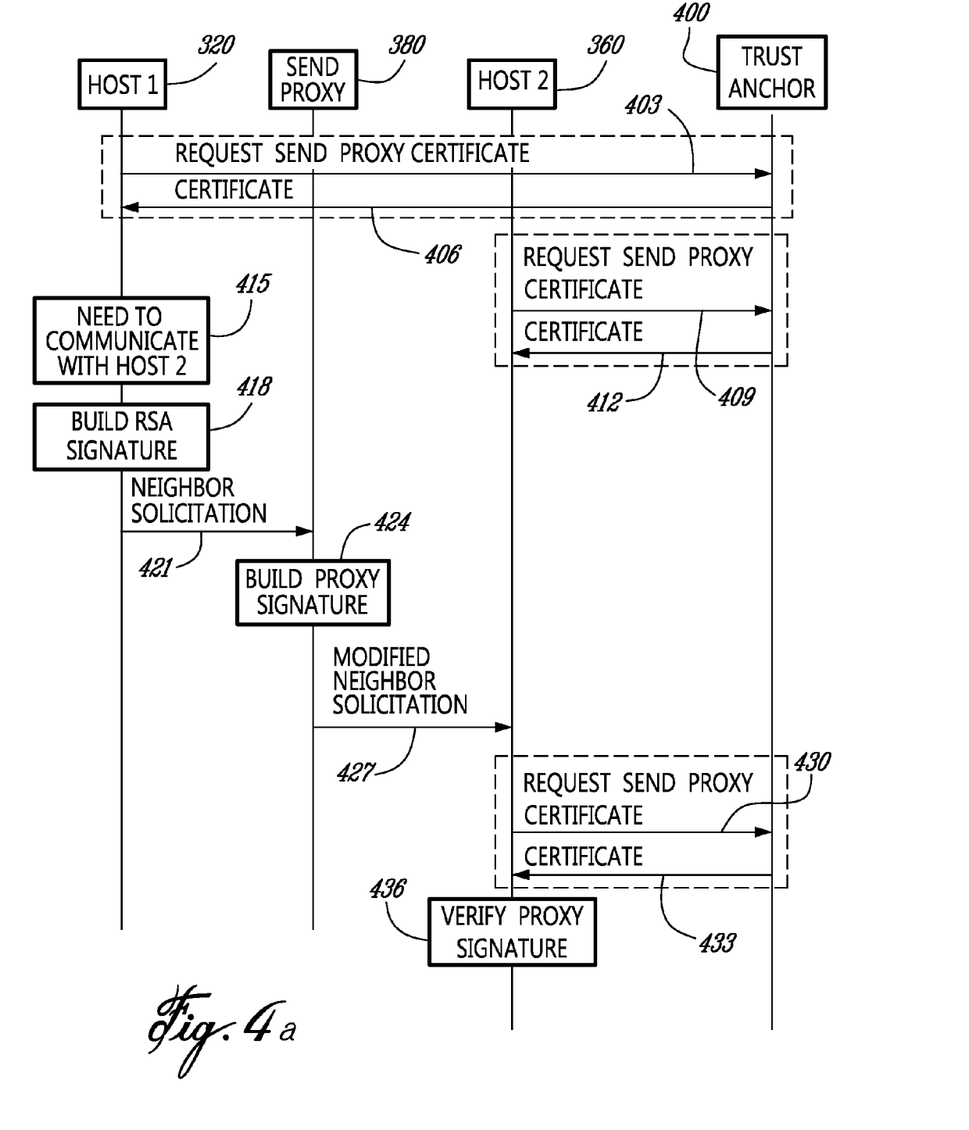
FIGS. 4a, 4b and 4c show a sequence diagram depicting exemplary steps of the method of the present invention.
Figure 4B:
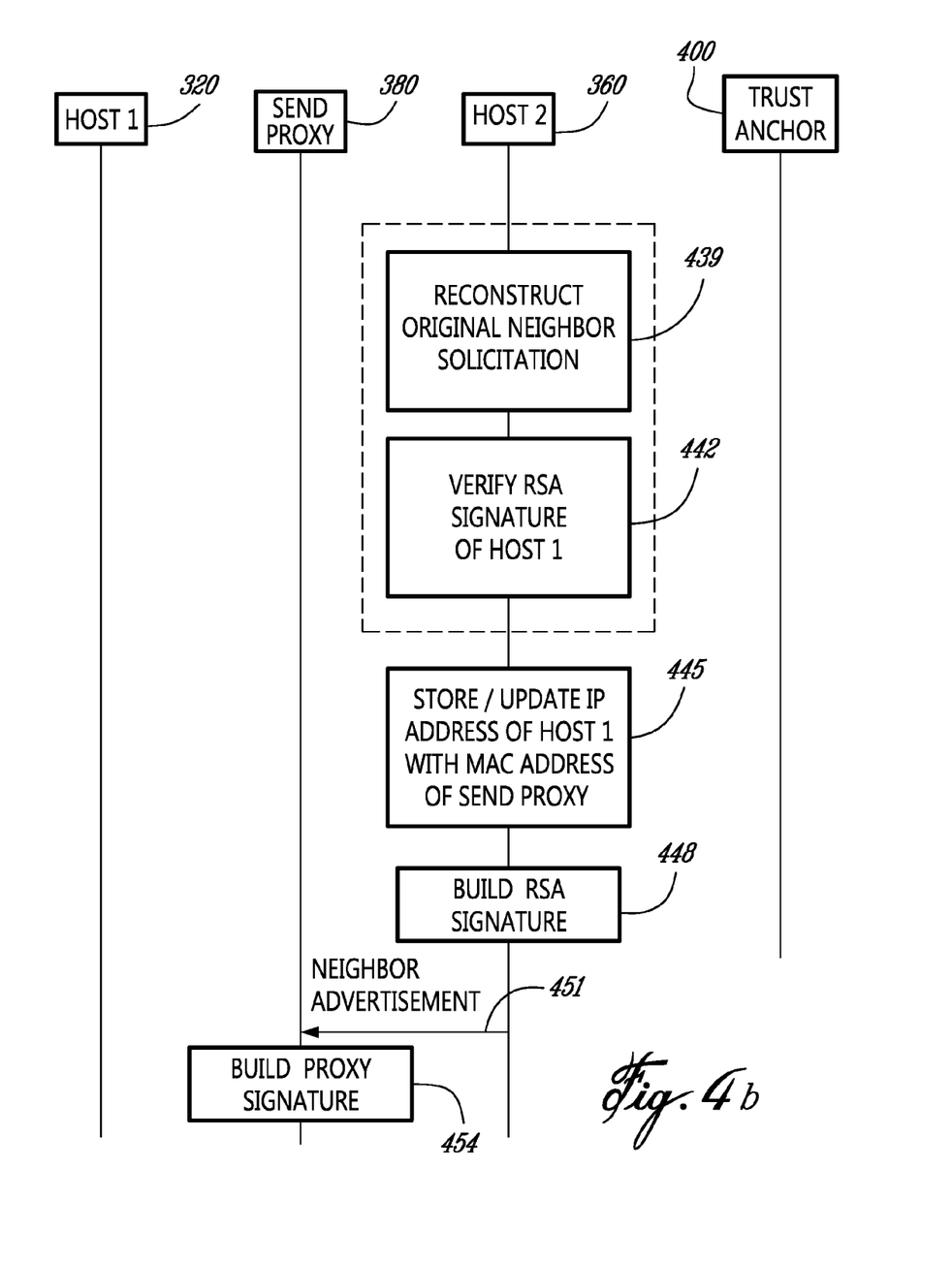
Figure 4C:
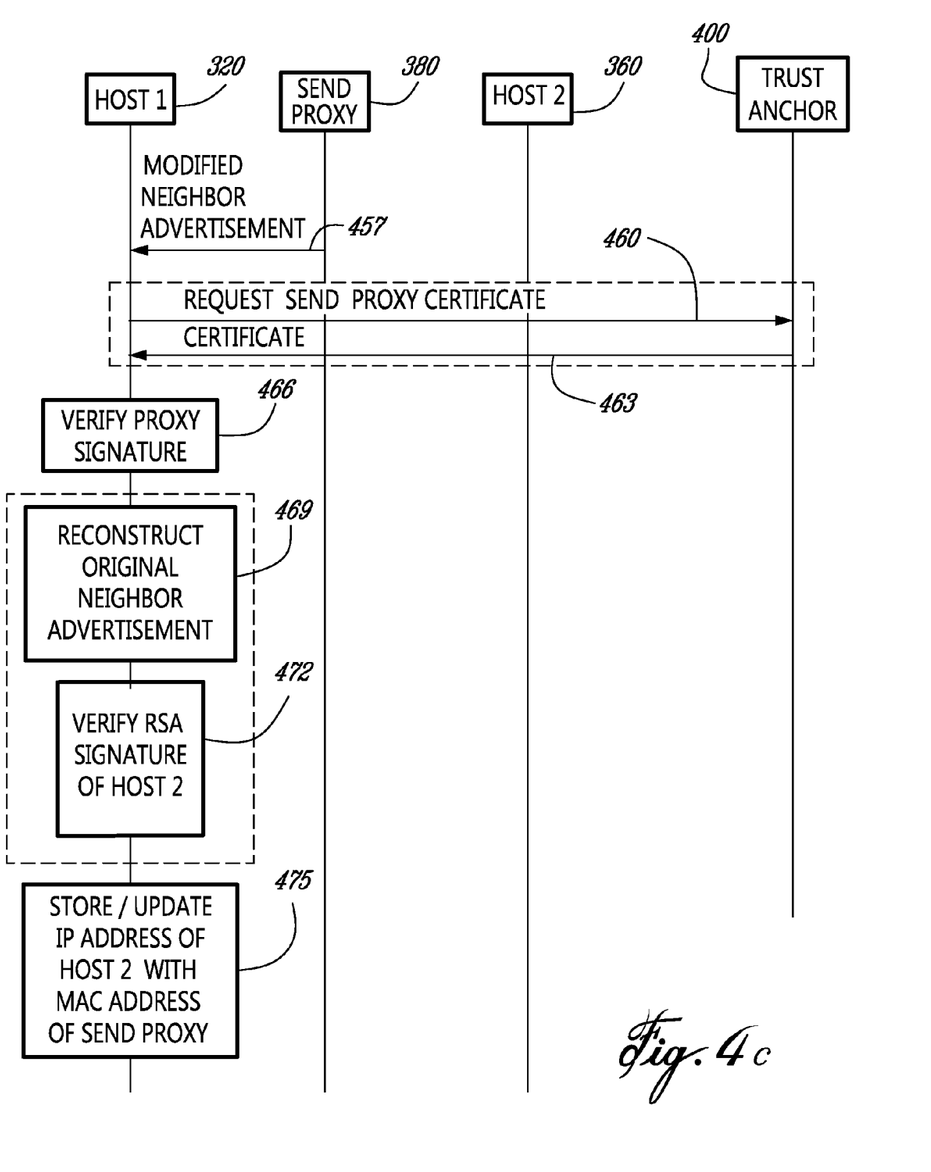

FIGS. 4a, 4b and 4c show a sequence diagram depicting exemplary steps of the method of the present invention. The first and second hosts 320 and 360, as well as the SEND proxy 380, introduced in relation with the description of FIG. 3, and a trust anchor 400, are involved in the sequence of FIGS. 4a, 4b and 4c. Addition of the trust anchor 400 to the network of FIG. 3 allows including both the hosts 320 and 360 as well as the SEND proxy within a trusted infrastructure.

The method may optionally start at step 403 where the first host 320, knowing that it will need to communicate with other hosts through the SEND proxy 380, may request from the trust anchor 400 a security certificate for the SEND proxy 380. If so, the trust anchor 400 responds at step 406 with the certificate of the SEND proxy 380, comprising a public key of the SEND proxy 380. Likewise, the second host 360 may optionally request at step 409 a certificate of the SEND proxy 380 from the trust anchor 400. If so, the trust anchor responds at step 412 with the security certificate of the SEND proxy 380. Of course, the first and second hosts may keep in memory their copies of the security certificate of the trust anchor 400 for extended periods of time. Steps 403-412 thus do not need to be repeated every time the sequence of FIGS. 4a, 4b and 4c is executed.

At step 415, the first host 320 desires to enter in communication with the second host 360. Even in a case where the first and second hosts have been in communication at an earlier time, there may be circumstances where it is preferable to perform again a ND procedure, as described hereinbelow, because, for example, the second host 360 may have modified its layer 2 connection. One example of the second host 360 modifying its layer 2 connection would be when an Ethernet connection is unplugged and a WLAN connection takes over traffic for the second host 360. Because the first and second hosts are located on distinct subnetworks, a simple ND procedure is not available and discovery signaling need to transit through a bridge connecting the two subnetworks, the SEND proxy 380 providing bridging functionality. At step 418, the first host 320 builds a RSA signature. The RSA signature may be conventional and may, for example, be built according to the RSA signature format 200 of FIG. 2. The RSA signature may be built according to a variety of parameters, including at least a source link layer address (SLLA), which is the MAC address MAC_H1 of the first host 320. At step 421, the first host 320 sends a neighbor solicitation message on a link of the subnetwork 310, by use of a port having the address MAC_H1. The SEND proxy 380, which is connected on the same link of the subnetwork 310, detects the neighbor solicitation message via its own MAC address MAC_P1. At step 424, the SEND proxy 380 builds a proxy signature for use in forwarding a modified neighbor solicitation towards the second host 360. The proxy signature is added to the modified neighbor solicitation according to the aforementioned PSI format.

Figure 5:
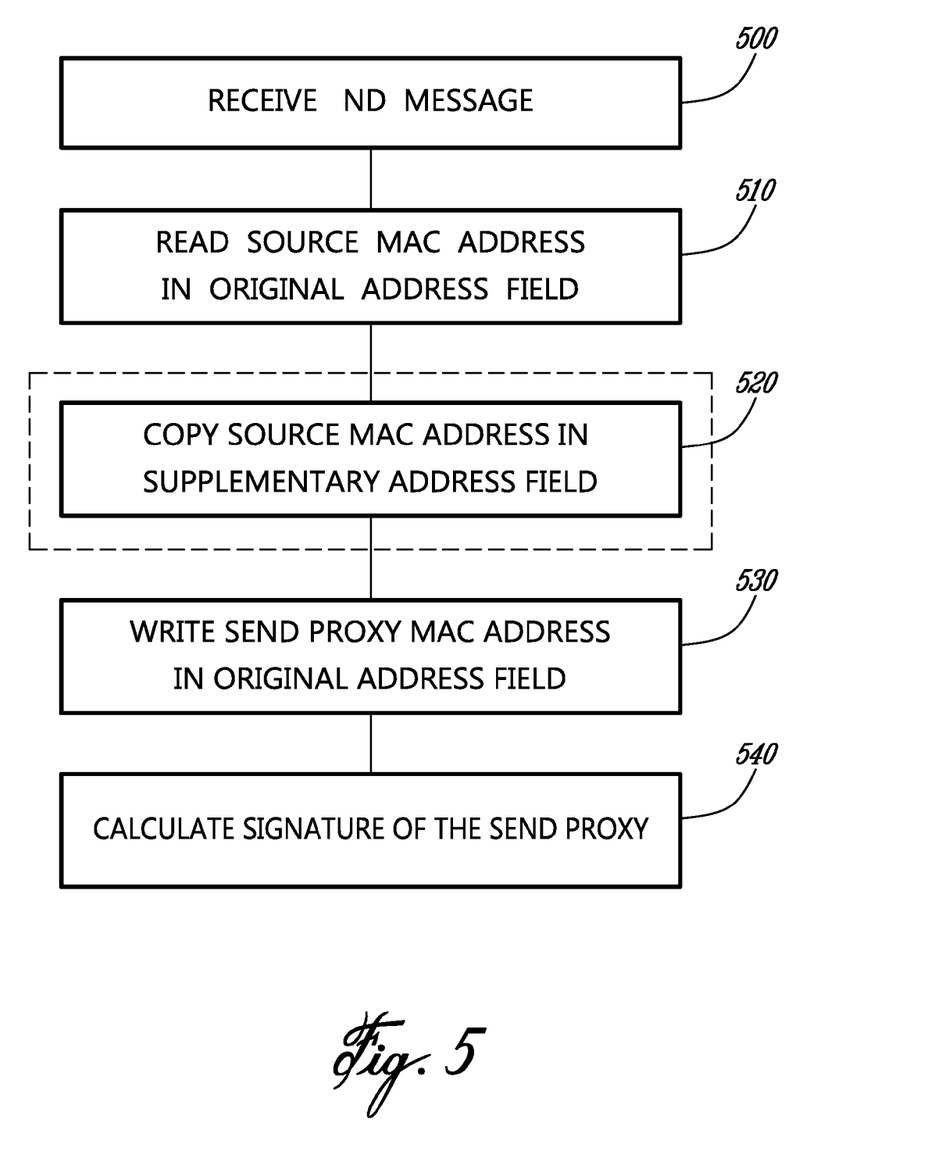
FIG. 5 shows an exemplary method of calculating a proxy signature according to some aspects of the present invention.
Figure 6:
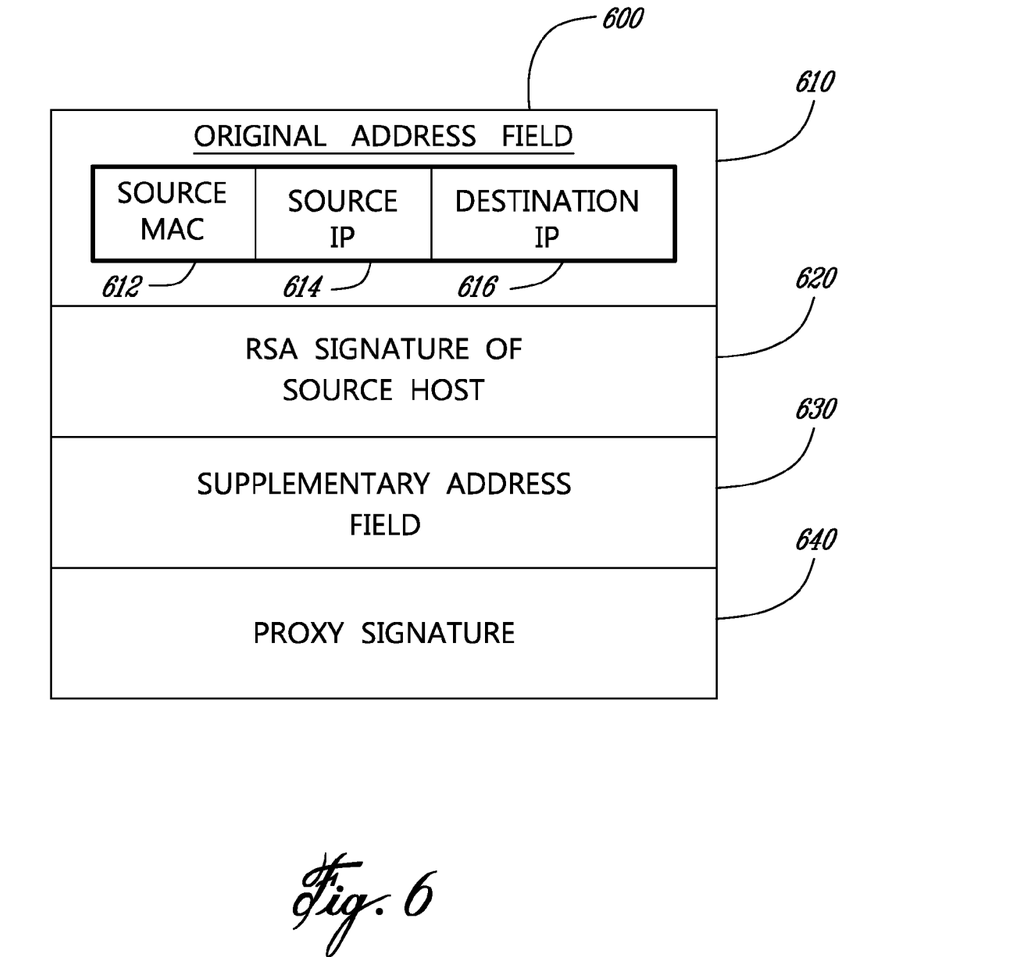
FIG. 6 shows a simplified neighbor discovery message content according to some aspects of the present invention.

Details of a manner of building the proxy signature as in step 424 of FIG. 4a are shown on FIG. 5 which shows an exemplary method of calculating a proxy signature according to some aspects of the present invention. The method of FIG. 5 is further described in relation to FIG. 6 which shows a simplified neighbor discovery message content according to some aspects of the present invention. Referring to FIG. 6, the ND message 600 comprises an original address field 610 and a RSA signature 620 of a host having originated the ND message (the source host). The original address field 610 further comprises a MAC address 612 of the source host, an IP address of the source host, also called source IP 614, and a destination address of a host towards which the ND message is intended, also called destination IP 616. Other fields shown on FIG. 6 comprise a supplementary address field 630 and a proxy signature 640, which will be referred to hereinbelow. The method of FIG. 5 starts at step 500 when the SEND proxy 380 receives a ND message, for example the neighbor solicitation message as in step 421 of FIG. 4a. At step 510, the SEND proxy 380 reads from the ND message the source MAC address 612. The source MAC address 612 is optionally copied in the supplementary address field 630, whereby the ND message 600 is modified at step 520. Then at step 530, the SEND proxy 380 further modifies the ND message by writing its own MAC address in the original address field 610, overwriting the source MAC 612. The own MAC address of the SEND proxy 380 may for example be MAC_P2, which is the layer 2 address of the SEND proxy 380 on a same subnetwork as the second host 360, as shown on FIG. 3. At step 540, the SEND proxy 380 calculates the proxy signature 640 and adds it to the modified ND message. This signature is preferably an RSA signature of the SEND proxy 380, preferably built according to the PSI format. Preferably, the proxy signature 640 is based on a complete information field of the ND message, comprising the original address field 610, as modified at step 530, and the RSA signature 620 of the source host. The signature is also preferably based on the supplementary address field 630. Of course, the proxy signature 640 may also be based on other parameters.

Returning to the sequence of FIGS. 4a, 4b and 4c, after the SEND proxy 380 has built the proxy signature 640 at step 424, the SEND proxy 380, at step 427, forwards the modified neighbor solicitation message towards the second host 360 by placing the message on a link layer of the second subnetwork 350 by use of its port having the address MAC_P2. The second host 360, which is connected on the same link of the subnetwork 350, receives the modified neighbor solicitation message via its own port having the MAC address MAC_H2. At this point, the second host 360 may have previously obtained the certificate of the SEND proxy 380 at optional steps 409 and 412. If the certificate is not present in the second host 360 following receipt of the modified neighbor solicitation, the second host 360 obtains the certificate at steps 430 and 433. Then at step 436, the second host 360 verifies the RSA signature of the SEND proxy 380 by use of the public key of the SEND proxy 380 contained in the certificate of the SEND proxy 380. This verification allows the second host 360 to ascertain that the modified neighbor solicitation has been sent by a legitimate node. When the SEND proxy 380 is part of a trusted infrastructure known by the second host 360, verification of the SEND proxy RSA signature at step 436 is sufficient for the second host 360 to consider that the entire content of the modified neighbor solicitation is valid. The process may then continue directly at step 445. However, if the second host 360 does not entirely trust the SEND proxy 380, it may verify that the neighbor solicitation had originally been initiated by a legitimate node as well. For this, the second host 360 may execute steps 439 and 442. At step 439, the second host 360 reconstructs the original neighbor solicitation message by overwriting the MAC address of the SEND proxy 380, now present in the original address field 610, with the value found in the supplementary address field 630. For example, the value MAC_H1 may be read from the supplementary field 630 and returned to the original address field as the source MAC 612. At step 442, the RSA signature 620 of the first host 320 is verified; this verification is rendered possible because the original source MAC address 612 of the neighbor solicitation has been returned in its original place in the message.

At step 445, assuming that the second host 360 is satisfied with the verification of the modified neighbor solicitation, either through the SEND proxy RSA signature or by verifying the RSA signature of the first host 320, it stores in a neighbor cache the MAC address of the proxy, for example MAC_P2, in association with the IP address of the first host 320. It will later use this address pair to communicate with the first host 320. If the second host 360 previously had a cache entry for the first host 320, step 445 consists of an update to the cache entry. The second host 360 then builds, at step 448, an RSA signature. As in the case of step 418, this RSA signature may be conventional and may be built according to the RSA signature format 200 of FIG. 2. The RSA signature may be built at least in part based on a target link layer address (TLLA) of the second host 360, which is the MAC address MAC_H2 of the second host 360. At step 451, the second host 360 sends a neighbor advertisement message on a link of the subnetwork 320, by use of a port having the address MAC_H2. The SEND proxy 380, which is connected on the same link of the subnetwork 320, detects the neighbor advertisement message via its own MAC address MAC_P2. At step 454, the SEND proxy 380 builds another proxy signature 640 for use in forwarding a modified neighbor advertisement towards the first host 320. The method as described in FIG. 5 is used, once more, to build the proxy signature 640. From the step 454, the original MAC address of the second host 360 contained in the original neighbor advertisement as the source MAC 612, for example the TLLA MAC_H2, is moved to the supplementary field 630 in a modified neighbor advertisement, and the own MAC address of the SEND proxy 380 overwrites the source MAC 612 of the neighbor advertisement. The own MAC address of the SEND proxy 380 may for example be MAC_P1, which is the layer 2 address of the SEND proxy 380 on a same subnetwork as the first host 320, as shown on FIG. 3. The proxy signature 640 is also added based on current contents of the two address fields 610 and 630. As in the case of the modified neighbor solicitation, the modified neighbor advertisement includes the proxy signature 640, preferably according to the PSI format.

After the SEND proxy 380 has built the proxy signature 640 at step 454, the SEND proxy 380, at step 457, forwards the modified neighbor advertisement message towards the first host 320 by placing the message on a link layer of the first subnetwork 310 by use of its port having the address MAC_P1. The first host 320, which is connected on the same link of the subnetwork 310, detects the modified neighbor advertisement message via its own MAC address MAC_H1. At this point, the first host 320 may have previously obtained the certificate of the SEND proxy 380 at optional steps 403 and 406. If the certificate is not present in the first host 320 following receipt of the modified neighbor advertisement, the first host 320 obtains the certificate at steps 460 and 463. Then at step 466, the first host 320 verifies the RSA signature of the SEND proxy 380 by use of the public key of the SEND proxy 380 contained in the certificate. This verification allows the first host 320 to ascertain that the modified neighbor advertisement has been sent by a legitimate node. Optionally, the first host 320 verifies that the neighbor advertisement had originally been initiated by a legitimate node as well. For this, the first host 320 may execute steps 469 and 472. At step 469, the first host 320 reconstructs the original neighbor advertisement message by overwriting the source MAC 612 field with the value found in the supplementary address field 630, for example the value MAC_H2. At step 472, the RSA signature 620 of the second host 360 is verified; this verification is rendered possible because the original source MAC address 612 of the neighbor advertisement has been returned in its original place in the message. At step 475, the first host 320 stores, or updates, in a neighbor cache the MAC address of the proxy, for example MAC_P1, in association with the IP address of the second host 360.

Figure 7:
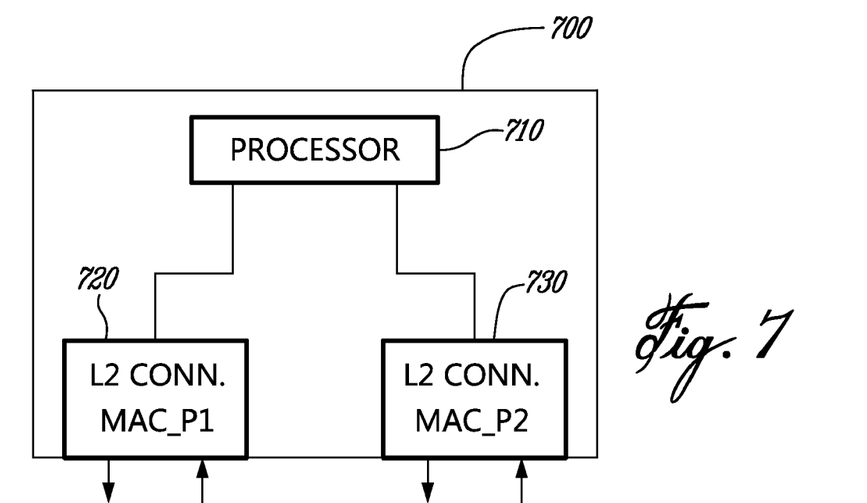
FIG. 7 shows an exemplary proxy built according to an aspect of the present invention.

An exemplary construction of a proxy will now be described by reference to FIG. 7, which shows an exemplary proxy built according to an aspect of the present invention. The proxy 700 comprises a processor 710 and at least two layer 2 connections 720 and 730. The proxy 700 may comprise a memory (not shown), but for the purposes of the present invention, operation of the proxy 700 may be memoryless. The proxy 700 of the present invention may further comprise many more elements found in regular proxies, bridges or switches, as are well known in the art of networking devices. These additional elements are not shown herein for ease of illustration.

The processor 710 may for example comprise any commercial, programmable processor. Each of the layer 2 connections 720 and 730 may be implemented as one single device or as distinct devices for receiving (input) and sending (output) signaling, messages and data. The proxy 700 is connected towards a plurality of hosts; means for connecting the proxy 700 towards hosts may vary as, for example, one layer 2 connection may provide communication towards one host might be on an Ethernet link while connection towards another host, on the other layer 2 connection, might be on an asynchronous transfer mode (ATM) link. Therefore proxy 700 may comprise a plurality of devices for connecting on a plurality of links of different types. Only two layer 2 connections are illustrated for ease of presentation of the present invention.

In operation, the proxy 700 receives, on a first layer 2 connection, for example layer 2 connection 720, on MAC address MAC_P1, a ND message from a first host. The ND message may be a ND solicitation or a ND advertisement. The layer 2 connection 720 informs the processor 710. The processor 710 modifies the ND message by first reading from the ND message a first field comprising an original MAC address of the first host, and a second field comprising a first signature of the first host. The processor 710 copies the MAC address of the first host into a third field that is added to the modified ND message. The processor 710 then overwrites in the first field the MAC address of the first host with the MAC address of the other layer 2 connection 730, which is MAC_P2. The processor 710 finally inserts in the modified ND message a second signature of the proxy 700 based on the first field in its current value, on the first signature and on the third field. The processor 710 then requests the second layer 2 connection 730 to send on a second link the modified ND message towards a second host.

Figure 8:
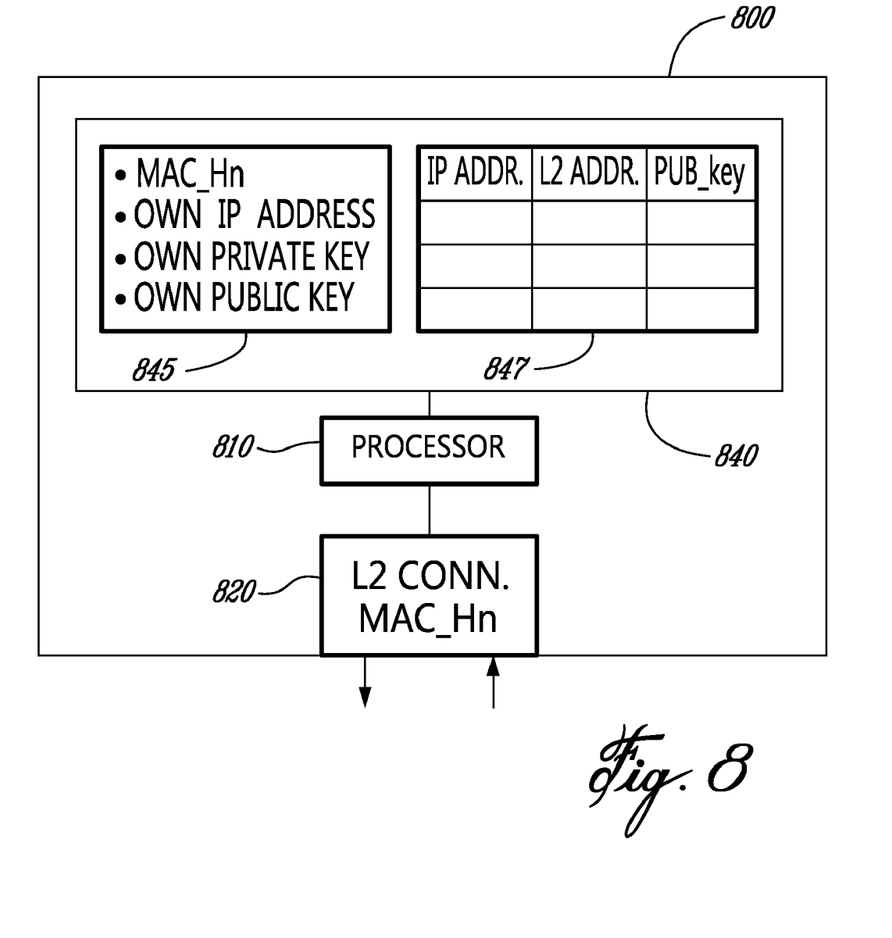
FIG. 8 shows an exemplary host built according to an aspect of the present invention.

FIG. 8 shows an exemplary host built according to an aspect of the present invention. The host 800 comprises a layer 2 connection 820, a processor 810 and a memory 840. Because the host 800 may represent a variety of distinct devices, it may further comprise a display, a keyboard, a mouse, several additional processors, and many other components (not shown). The processor 810 may be dedicated to ND signaling or may also support other tasks of the host 800. The memory 840 is a non-volatile memory, or persistent memory, that can be electrically erased and reprogrammed and that may be implemented, for example, as a flash memory or as a data storage module. The layer 2 connection 820 may be implemented as one single device or as distinct devices for receiving (input) and sending (output) signaling, messages and data. The host 800 may comprise more than one layer 2 connection. FIG. 8 is thus simplified for ease of illustration.

The memory 840 permanently or semi-permanently stores information 845 related to the host 800 itself. This comprises for example a layer 2 address MAC_Hn of the layer 2 connection 820, an IP address allocated to the host 800, a private key and a public key of the host 800 used for calculating an RSA signature, and the like. As is well known in the art, the IP address allocated to the host 800 may be permanent, or may be allocated by a network to which the host 800 is currently connected. The memory 400 may also store, in a table 847, IP addresses, link layer addresses and public keys of other nodes such as proxies, routers and other hosts. The memory 400 further may store other data as is well known in the art.

In operation, if the host 800 needs to initiate communication with another host, it needs to obtain a link layer address for use with communicating with that host. It may have first obtained an IP address of that host through well-known means such as route lookup. In order to obtain that link layer address leading towards the other host, it needs to send a ND solicitation on its layer 2 connection 820. The ND solicitation comprises the MAC_Hn address, which in turns become a source link layer address (SLLA) for this transaction. The processor 810 reads from the memory 840 the SLLA, the IP address of this host 800 and the IP address of the other host, and the private key of the host 800. The processor builds a RSA signature based on these and other parameters and instructs the layer 2 connection 820 to place the ND solicitation on a layer 2 link to which it is attached.

The layer 2 connection 820 may receive a ND solicitation message. It forwards this ND solicitation and its content to the processor 810. If the ND solicitation comprises a PSI, the processor 810 detects it as an indication that the ND solicitation initiated by an originating host has been modified by a proxy and that a link layer address included in the ND solicitation is a MAC address of the proxy and not an original address of originating host. The processor 810 reads a public key of the proxy from the table 847. If found, the public key of the proxy is used to verify a proxy signature included in the PSI. If this verification fails, the ND solicitation is simply discarded. Otherwise, the processor 810 may preferably read from the PSI an SLLA of the host having initiated the ND solicitation. By overwriting within the ND solicitation the MAC address of the proxy with the SLLA of the originating host, the processor 810 may then verify an RSA signature of the originating host. Verification of the RSA signature requires that the processor 810 reads from the table 847 a public key of the originating host. Provided that the RSA signature is valid, the processor 810 stores in the table 847 the MAC address of the proxy along with the IP address of the originating host, thereby creating a cache entry for the originating host within the table 847. The processor then reads from the memory 840 the own layer 2 address MAC_Hn of the host 800 and places it an ND advertisement message, within a target link layer address (TLLA) field. The MAC address of the proxy, the IP address of the host 800 and other parameters are also placed in the ND advertisement. The processor 810 calculates an RSA signature and inserts it in the ND advertisement. The processor 810 then requests the layer 2 connection 820 to place the ND advertisement on the layer 2 link.

The layer 2 connection 820 may receive a ND advertisement. It forwards this ND advertisement and its content to the processor 810. If the ND advertisement comprises a PSI, the processor 810 detects it as an indication that the ND advertisement initiated by a responding host has been modified by a proxy and that a MAC address, or link layer address, included in the ND advertisement, is an address of the proxy and not an original TLLA of a responding host. The processor 810 reads a public key of the proxy from the table 847. If found, the public key of the proxy is used to verify a proxy signature included in the PSI. If this verification fails, the ND advertisement is simply discarded. Otherwise, the processor 810 may preferably read from the PSI the TLLA of the host having initiated the ND advertisement. By overwriting the MAC address of the proxy with the TLLA of the responding host, the processor 810 may then verify an RSA signature of the responding host. Verification of the RSA signature requires that the processor 810 reads from the memory 840 a public key of the responding host. Provided that the RSA signature is valid, the processor 810 stores in the memory 840 the MAC address of the proxy along with the IP address of the responding host.

Although several aspects of the preferred embodiment of the method, and of the proxy of the present invention have been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

The invention claimed is:

1. A method of secure neighbor discovery between hosts connected through a proxy, the method comprising the steps of:
   receiving from a first host, at the proxy, a neighbor discovery (ND) message intended for a second host, the ND message comprising an internet protocol (IP) address of the first host, a layer two address of the first host, and a first signature of the first host based at least in part on the layer two address of the first host;
   modifying, at the proxy, the ND message by:
      copying from the ND message the layer two address of the first host into an additional message field,
      overwriting the layer two address of the first host with a layer two address of the proxy,
      inserting a second signature of the proxy based at least in part on the layer two address of the proxy; and
   sending towards the second host the modified ND message.

2. The method of claim 1, further comprising the steps of:
   receiving at the second host the modified ND message;
   obtaining from a trust anchor a public key of the proxy;
   verifying at the second host the second signature by use of the public key of the proxy; and
   storing at the second host the layer two address of the proxy in relation with the IP address of the first host.

3. The method of claim 2, further comprising the step of:
   receiving at the proxy, from the second host, a data packet, the data packet comprising the IP address of the first host and the layer two address of the proxy.

4. The method of claim 1, further comprising the steps of:
   receiving at the second host the modified ND message;
   verifying at the second host the second signature;
   reconstructing the ND message at the second host by overwriting the layer two address of the proxy with the layer two address of the first host;
   verifying the first signature of the first host; and
   storing at the second host the layer two address of the proxy in relation with the IP address of the first host.

5. The method of claim 1, wherein:
   the second signature of the proxy is further based on the IP address of the first host, an IP address of the second host, the layer two address of the first host and the first signature of the first host.

6. The method of claim 5 wherein:
   the second signature of the proxy is based on a complete information field of the ND message.

7. A method of securely receiving a neighbor discovery (ND) message in a host, the method comprising the steps of:
   receiving in the host the ND message comprising a layer two address of a proxy, a layer two address of a peer host, a signature of the peer host and a signature of the proxy;
   verifying the proxy signature by use of a public key of the proxy;
   modifying the ND message by replacing the layer two address of the proxy with the layer two address of the peer host;
   verifying the signature of the peer host by use of a public key of the peer host;
   storing the layer two address of the proxy as a layer two address for communicating with the peer host; and
   sending from the host a ND response message comprising a signature based on a private key of the host.

8. A proxy, comprising:
a first layer two connection for receiving a neighbor discovery (ND) message from a first host;
a processor for receiving the ND message from the first layer two connection and for modifying the ND message, the processor modifying the ND message by;
  reading from the ND message a first field and a second field, the first field comprising at least one original address, the second field comprising a first signature of the first host, wherein the at least one original address is a layer two address of the first host,
  copying from the received ND message at least one original address into a third field,
  overwriting in the first field one of the at least one original address with an address of the proxy, wherein the address of the proxy is a layer two address,
  inserting a second signature of the proxy based on the address of the proxy and on the at least one original address; and
a second layer two connection for sending the modified ND message towards a second host.

9. A host, comprising:
a memory for storing a layer two address and a private key of the host, a public key of a peer host, a public key of a proxy, and a layer two address for communicating with the peer host;
a layer two connection for receiving on a link a neighbor discovery (ND) message from a proxy and for sending on the link a ND response, wherein the ND message comprises a layer two address of the proxy, a layer two address of the peer host, a signature of the peer host, and a signature of the proxy; and
a processor for:
  verifying the signature of the proxy by use of the public key of the proxy,
  modifying the ND message by replacing the layer two address of the proxy with the layer two address of the peer host,
  verifying the signature of the peer host by use of the public key of the peer host, and
  storing in the memory the layer two address of the proxy as the layer two address for communicating with the peer host.

10. The host of claim 9, wherein:
the processor is further for reading from the memory the private key and the layer two address of the host, for using the private key in making a signature of the host based on the layer two address of the host, for making the ND response comprising the layer two address and the signature of the host, and for requesting the layer two connection to send the ND response.

* * * * *